(12) United States Patent
Kasai et al.

(10) Patent No.: US 10,899,389 B2
(45) Date of Patent: Jan. 26, 2021

(54) VEHICLE SUBSTRUCTURE

(71) Applicant: TOYOTA JIDOSHA KABUSHIKI KAISHA, Toyota (JP)

(72) Inventors: Satoshi Kasai, Nagoya (JP); Shinobu Tanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/243,119

(22) Filed: Jan. 9, 2019

(65) Prior Publication Data

US 2019/0217895 A1    Jul. 18, 2019

(30) Foreign Application Priority Data

Jan. 12, 2018  (JP) ................................ 2018-003376
Jan. 22, 2018  (JP) ................................ 2018-007929

(51) Int. Cl.
| | |
|---|---|
| *B62D 21/15* | (2006.01) |
| *B62D 21/03* | (2006.01) |
| *B62D 25/20* | (2006.01) |
| *B60K 1/04* | (2019.01) |
| *B62D 27/02* | (2006.01) |
| *B62D 27/06* | (2006.01) |

(52) U.S. Cl.
CPC ............. *B62D 21/157* (2013.01); *B60K 1/04* (2013.01); *B62D 21/03* (2013.01); *B62D 25/20* (2013.01); *B62D 27/023* (2013.01); *B62D 27/065* (2013.01); *B60K 2001/0438* (2013.01); *B60Y 2306/01* (2013.01)

(58) Field of Classification Search
CPC .. B60K 2001/0438; B60K 1/04; B62D 21/03; B62D 25/20; B62D 27/023; B62D 27/065; B60Y 2306/01
USPC ..................................................... 296/187.08
See application file for complete search history.

(56) References Cited

U.S. PATENT DOCUMENTS

| | | | |
|---|---|---|---|
| 2012/0161429 A1* | 6/2012 | Rawlinson | ............... B60L 50/64 280/801.1 |
| 2016/0039467 A1* | 2/2016 | Takenaka | ................ B62D 21/15 296/187.08 |

FOREIGN PATENT DOCUMENTS

| | | |
|---|---|---|
| CN | 103249637 | 8/2013 |
| JP | 2014-201277 | 10/2014 |

* cited by examiner

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A vehicle substructure, comprising a pair of rockers arranged apart in a vehicle width direction, and extending in a vehicle longitudinal direction, and a floor cross member that extends in the vehicle width direction and connects to the pairs of rockers, wherein the floor cross member includes a pair of floor cross member low-strength sections that are of weaker strength than a center portion, on both sides in the vehicle width direction.

7 Claims, 4 Drawing Sheets

VEHICLE SUBSTRUCTURE

CROSS REFERENCE TO RELATED APPLICATION

This application claims priorities to Japanese Patent Application No. 2018-003376 filed on Jan. 12, 2018 and Japanese Patent Application No. 2018-007929 filed on Jan. 22, 2018, which are incorporated herein by reference in their entireties including the specification, claims, drawings, and abstract.

TECHNICAL FIELD

The present disclosure relates to a vehicle substructure, and in particular to dealing with collision from the side.

BACKGROUND

Patent publication 1 discloses formation of a battery storage region with a floor upper case and floor lower case that constitute a vehicle floor, with a battery being mounted below this floor. Rigidity of the floor upper case and the floor lower case is then maintained by a side frame that is a skeleton structure (rigid structure) in the longitudinal direction of the vehicle, and a cross member that is a skeleton structure in the vehicle width direction.

CITATION LIST

Patent Literature

PATENT LITERATURE 1: JP 2014-201277-A

By maintaining rigidity using cross members, it is possible to reduce deformation of a vehicle substructure with respect to collisions from the side, and it is possible to make the impact on a battery small. Here, with this structure, while it is possible to make rigidity high with respect to collision from the side of the vehicle, collision energy absorption is small, and acceleration of the vehicle due to collision becomes comparatively large.

The present disclosure provides a vehicle substructure that can more effectively absorb collision energy.

SUMMARY

The present disclosure is a vehicle substructure, that comprises a pair of rockers arranged apart in a vehicle width direction, and extending in a vehicle longitudinal direction; and floor cross member that extends in the vehicle width direction and connects to the pairs of rockers; wherein the floor cross member includes a pair of floor cross member low-strength sections that are of weaker strength than a center portion, on both sides in the vehicle width direction.

Further, there is a battery that is arranged between the pairs of rockers, and the pair of floor cross member low-strength sections is positioned outside the battery in the vehicle width direction.

Also, the floor cross member may be arranged at an upper side of the battery, and the pair of rockers may be fixed at both sides of the battery.

A vehicle substructure may further comprise a pair of side members arranged apart in the vehicle width direction, and extending in the vehicle longitudinal direction, a battery arranged between the pair of side members, and a cross member that extends in the width direction of the vehicle and connects the pair of side members, wherein the cross member has a pairs of cross member low-strength sections that are of weaker strength than a center portion, on both sides in the vehicle width direction.

Also, the cross member may be arranged under the battery, and the pair of side members may be fixed to both ends of the cross member at positions outside of the battery. Also, the cross member low-strength sections may be positioned below the floor cross member low-strength sections.

According to the present disclosure, at the time of collision from the side, energy at the time of collision is absorbed to effectively cushion the impact, and it is possible to protect the battery.

DESCRIPTION OF EMBODIMENTS

Embodiments of the present disclosure will be described in the following based on the drawings. It should be noted that the present disclosure is not limited to the embodiments described herein.

Figure 1:
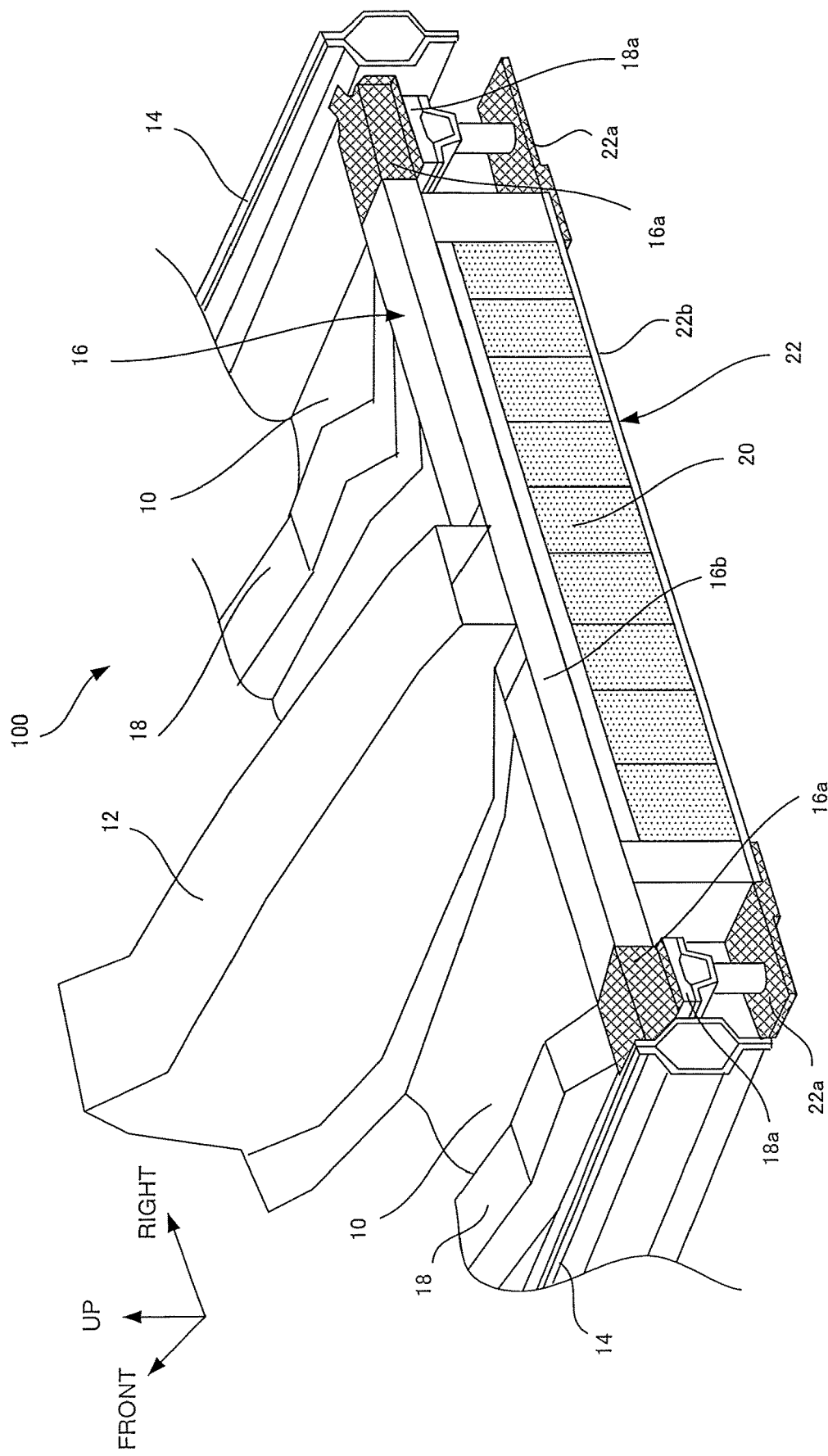
FIG. 1 is a perspective drawing showing a vehicle substructure of an embodiment.

FIG. 1 is a perspective drawing showing a vehicle substructure 100 of an embodiment. A floor tunnel 12 that extends in the vehicle longitudinal direction is arranged to a central section in the vehicle width direction of a floor panel 10. The floor tunnel 12 is formed by raising up part of the floor panel 10 so as to project upwards, with the inside creating a space in which various members are housed.

Rockers 14 that extend in the vehicle longitudinal direction are arranged on both left and right side sections (both sides in the vehicle width direction) of the floor panel 10. These rockers 14 are pipe shaped members with a quadrilateral cross section, formed by joining two long plates having a C-shaped cross section so that concave sections thereof face each other. The rockers 14 are structural components of the vehicle, and have relatively high strength.

Floor cross members 16 that extend in the vehicle width direction are provided on the floor panel 10. These floor cross member 16 are structural components of the vehicle, and protect against force from the side. Both left and right ends of the floor cross members 16 are fixed to sidewalls of the rockers 14. In this way, it is possible to protect the vehicle interior from front and rear directions and from left and right directions with the pairing of the rockers 14 and the floor cross members 16. The floor cross members 16 have a C-shaped cross-section, and are fixed on the floor panel 10 so that the concave sections face downwards.

Also, a pair of kicks 18 that extend in the longitudinal direction are arranged on the floor panel 10. These kicks 18 have a C-shaped cross-section, and are fixed from above to the floor panel 10 so that concave sections face downward. The kicks 18 are also arranged inside (positioned between) the pair of rockers 14, with front sides positioned centrally curving inwards, and rear sides positioned close to the rockers 14 (both sides in the vehicle width direction).

Between the pair of kicks 18, a battery 20 is arranged in a region below the floor panel 10. Specifically, the battery 20 is arranged between the pair of rockers 14, and between the pair of kicks 18. Also, the floor cross members 16 are positioned above the battery 20. Accordingly, the floor cross members 16 also function as protective members for the battery 20 in the vehicle width direction.

In this embodiment, cross members 22 that extend in the vehicle width direction are arranged below the battery 20, and the cross members 22 support the battery 20 from below. Also, the cross members 22 are long plates, and are fixed to side members 26 at both ends thereof. The cross members 22 are high-strength members, and function as protective members that protect the battery 20 from impact in the vehicle width direction.

Here, with this embodiment, floor cross member low-strength sections 16a are provided at joined sections of the floor cross members 16 with the rockers 14. These floor cross member low-strength sections 16a become low in strength (for example, allowable shearing stress) compared to the center section 16b of the floor cross members 16. For example, the strength is preferably about ½ that of the center section 16b.

With this embodiment, the floor cross member low-strength sections 16a are forming as separate members from the center section 16b. It is therefore possible to easily adjust strength by changing the material or thickness of the floor cross member low-strength sections 16a. The floor cross member low-strength sections 16a are not necessarily formed as separate members, and may also be formed by changing thickness, changing cross-sectional area or providing slits. It should be noted that in the event that the low strength sections 16a are made separate members the floor cross member, low-strength sections 16a are joined to the center section 16b by appropriate means such as welding.

It should be noted that the floor cross member low-strength sections 16a are basically members having a C-shaped cross section opening downwards, and are sections that spread out in a flange shape at both sides in the longitudinal direction, and at these sections they are joined to upper surface fastening sections 18a of the kicks 18. Also, flange-shaped edge sections are also formed for sections coming into contact with side surfaces of the rockers 14, and the low-strength sections 16a are joined to side surfaces of the rockers 14 at these points. The upper surface of the floor cross member low-strength sections 16a are extension sections that extend to the side, and these sections are then overlaid on the upper surfaces of the rockers 14. Accordingly, it is possible to fix the extension sections to the upper surfaces of the rockers 14. At these joints it is possible to utilize suitable means such as welding, similarly to as described above.

Also, cross member low-strength sections 22a are provided on connection sections of both ends of the cross member 22 with the side members 26. These cross member low-strength sections 22a are of low strength compared to the center section 22b of the cross member 22. Similarly to the floor cross member low-strength sections 16a, the cross member low strength sections 22a may be constructed as separate members to the center section 22b, or may be formed as part of the cross member 22, and it is also possible to perform adjustment of the strength in the same way as for the floor cross member low-strength sections 16a.

The cross member low-strength sections 22a are fixed to side members 26 via a collar 24, by bolt fastening. Specifically, the side members 26 are positioned at the rear of the kicks 18, above the cross member low-strength sections 22a, and under the rear of the kicks 18, with the floor panel 10 interposed between them. Accordingly the side members 26 and the cross member low-strength sections 22a are fastened using bolts that pass through the collar 24.

Figure 2:
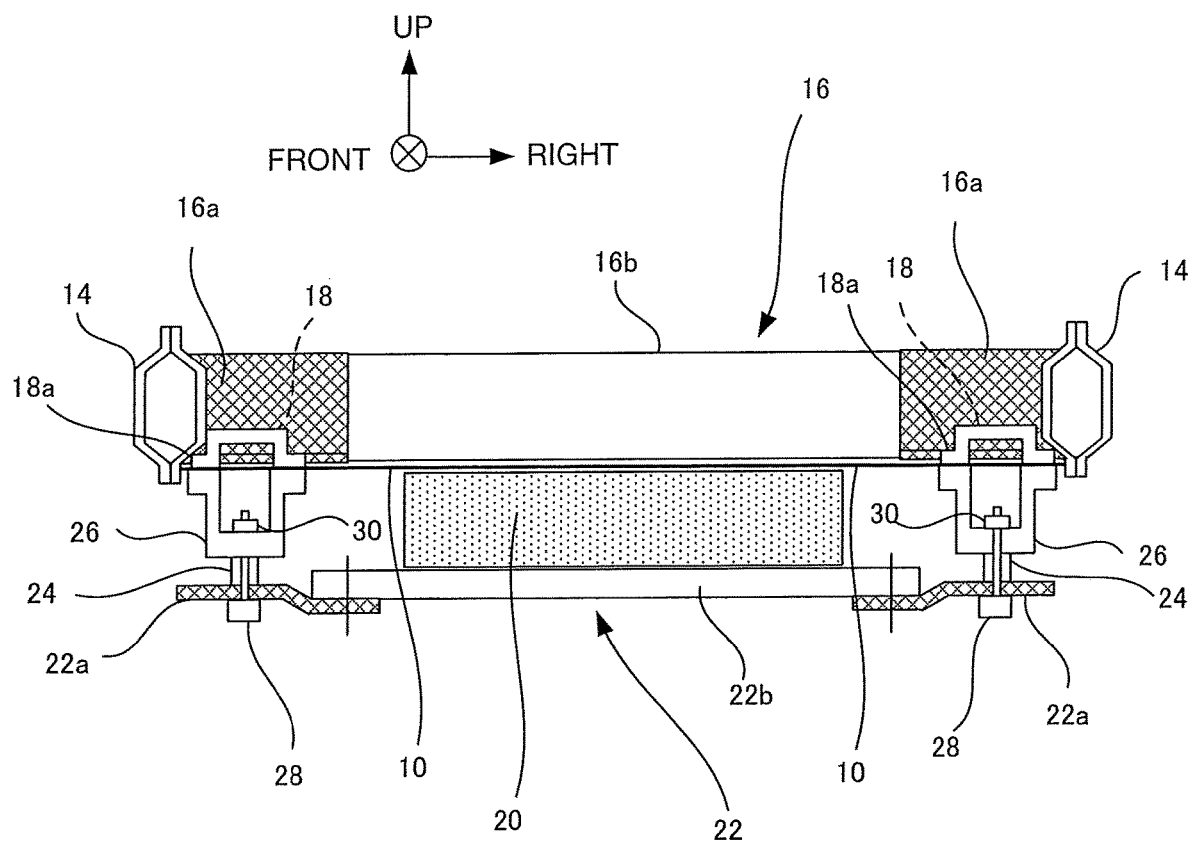
FIG. 2 is a schematic drawing looking at the vehicle substructure of an embodiment from the rear.

The structure of the floor cross members 16, cross members 22, rockers 14 and kicks 18 is schematically shown in FIG. 2, looking from the rear. In particular, joined sections between the cross member low-strength sections 22a and the side members 26 are clearly shown. The cross member low-strength sections 22a are plate-shaped, similarly to the cross members 22, with one end (inner end) joined to an end section of a cross member 22 (for example, welded). The cross member low-strength sections 22a have an inclined section in a center part in the vehicle width direction, with an outer side at a high position and an inner side at a low position. Inner sections of the cross member low-strength sections 22a are then joined to one end of the cross member 22 from a lower side.

The side members 26 are members having a C-shaped cross section opening upwards, and have flange sections (edge sections) on an upper surface joined to flange sections of the kicks 18. A lower surface of a side member 26 faces a cross member low-strength section 22a, with a hollow cylindrical collar 24 being arranged between the two, and by passing a bolt 28 through the cross member low-strength section 22a, collar 24 and side member 26 and fastening a nut 30 to a tip end of this bolt 28, the cross member low-strength section is fixed to the side member 26.

Here, both ends of the center section 16b of the floor cross member 16, and the center section 22b of the cross member 22, continue to beyond the battery 20 in the vehicle width direction. In other words, positions where the strength of the floor cross member low-strength sections 16a and the cross member low-strength section starts to become weaker are outside the battery 20 in the vehicle width direction. Accordingly, it is possible to protect the battery 20 using the high-strength center sections 16b of the floor cross members 16 and the center sections 22b of the cross members 22.

Figure 3:
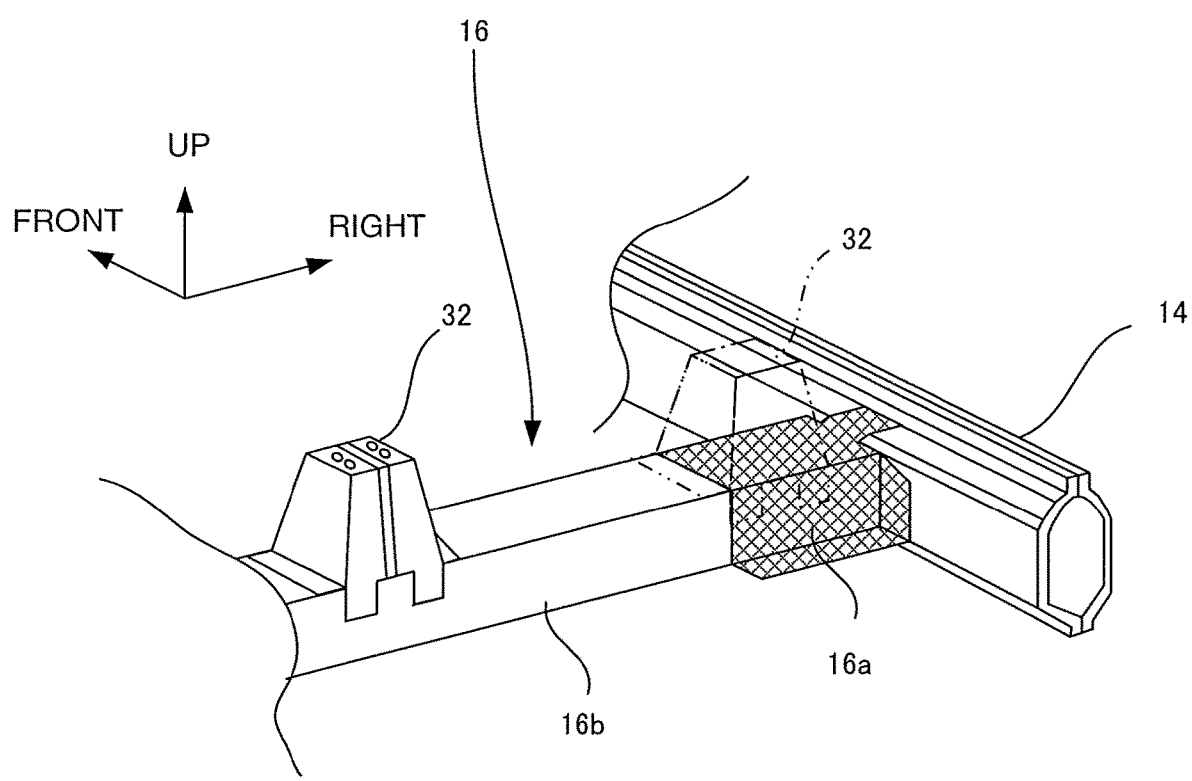
FIG. 3 is a perspective drawing showing a state where a seat bracket has been attached to a floor cross member.

The structure of a floor cross member 16 is shown in FIG. 3. A seat bracket 32 for fixing seats on which occupants will sit is fixed to a floor cross member 16. The seat bracket 32 is a box shaped member having a truncated square pyramid outer shape, with flange sections (edge sections) of a bottom part being fixed to an upper surface and side surfaces of the floor cross member 16 by welding etc. A seat (seat rail) is then fixed to an upper surface of this seat bracket 32. The seat bracket 32 is of low strength compared to the center section 16b of the floor cross member 16.

Here, with this embodiment, a seat bracket 32 at an outer side in the vehicle width direction, shown by the two-dot chain line, is attached to a floor cross member low-strength section 16a. As a result of this, in the event that force is applied to the floor cross member low-strength section 16a, then even if that force is transmitted to the seat bracket 32 the box shaped seat bracket 32 will collapse, and impact is effectively absorbed at that portion also.

In this way, with the vehicle substructure of this embodiment, there are the floor cross member low-strength sections 16a at connecting portions between the floor cross members 16 and the rockers 14. There are also the cross member low-strength sections 22 at connecting portions between the cross members 22 and the kicks 18. This means that at the time of collision to a vehicle side section, when a strong force is received in a direction from the vehicle side surface towards the inside, the floor cross member low-strength sections 16a and the cross member low-strength section 22a are deformed to absorb the impact force. Accordingly, it is possible to reduce acceleration on a battery 20 caused by receiving impact of a collision, and it is possible to effectively protect the battery 20. Also, it is possible to reduce acceleration on the vehicle interior, and it is possible to improve protection performance with regard to occupants inside the vehicle interior and other devices.

Also, by providing the seat bracket 32 on the floor cross member low-strength section 16a, as shown in FIG. 3, energy absorption also occurs due to deformation of the seat bracket 32, and it is possible to increase the total energy absorption amount.

Figure 4:
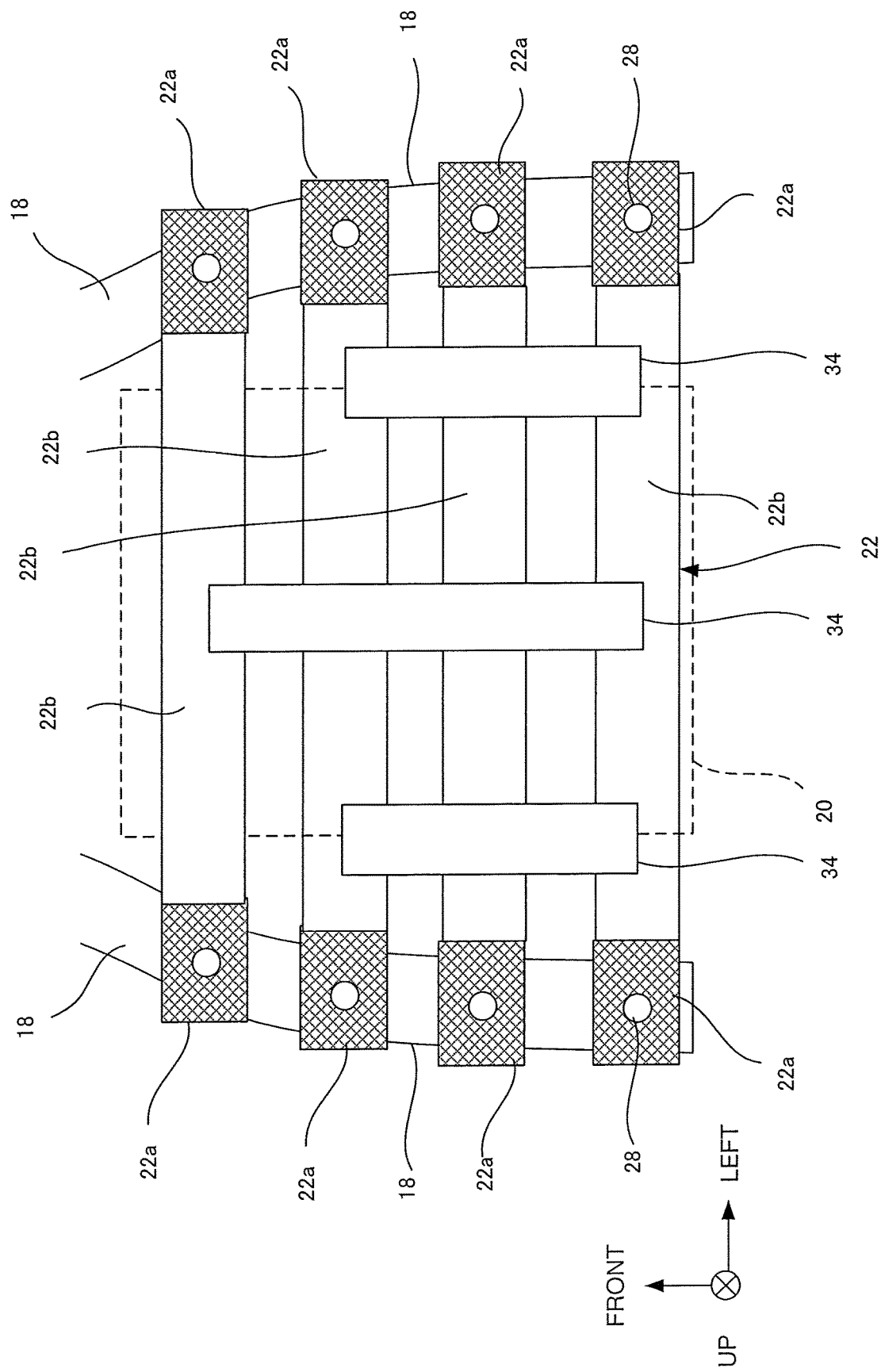
FIG. 4 is a schematic drawing looking at a battery mounting section of the vehicle substructure of an embodiment, from below.

FIG. 4 is a drawing of a battery 20 mounting section of the vehicle substructure, looking from below. With this example, the battery 20 is arranged on a plurality of cross members 22 in the vehicle longitudinal direction, and occupies a comparatively large area. Four cross members 22 are arranged at intervals in the vehicle longitudinal direction. Cross member low-strength sections 22a are then provided on both ends of each cross member 22, and floor cross member low-strength sections 16a are respectively fitted to the side members 26.

Also, stiffening members 34 that connect a plurality of cross members 22 are provided in the vehicle longitudinal direction. With this example, two stiffening members 34 that connect three cross members 22 are provided, and a single stiffening member 34 that connects four cross members 22 is provided between them. With this type of structure, it is possible to effectively protect the battery 20.

It should be noted that vehicle structural components for providing vehicle rigidity need to withstand large impacts, and normal steel materials are adopted. Metallic materials are also suitable for members that absorb energy by being deformed.

The invention claimed is:

1. A vehicle substructure, comprising:
   a pair of rockers arranged apart in a vehicle width direction, and extending in a vehicle longitudinal direction;
   a floor cross member that extends in the vehicle width direction and connects to the pairs of rockers; and
   a pair of side members arranged apart in the vehicle width direction, and extending in the vehicle longitudinal direction, wherein
   the floor cross member includes a floor cross member center portion and a pair of floor cross member low-strength sections that are arranged on opposite sides of the floor cross member center portion in the vehicle width direction,
   an outer side of each of the pair of floor cross member low-strength sections is fixed to one of the pair of rockers,
   a lower side of each of the pair of floor cross member low-strength sections is fixed to one of the pair of side members, and
   each of the pair of floor cross member low-strength sections have a strength weaker than a strength of the floor cross member center portion.

2. The vehicle substructure of claim 1, further comprising:
   a battery that is arranged between the pairs of rockers, and wherein
   the pair of floor cross member low-strength sections is positioned outside the battery in the vehicle width direction.

3. The vehicle substructure of claim 1, further comprising:
   a battery that is arranged between the pairs of rockers, and wherein
   the floor cross member is arranged above the battery, and both ends of the floor cross member is fixed to the pairs of rockers are fixed at positions outside of the battery.

4. The vehicle substructure of claim 3, wherein:
   the pair of floor cross member low-strength sections are positioned outside the battery in the vehicle width direction.

5. The vehicle substructure of claim 1, further comprising:
   a battery arranged between the pair of side members, and
   a cross member that extends in the width direction of the vehicle and connects the pair of side members, wherein
   the cross member includes a cross member center portion and a pair of cross member low-strength sections that are of weaker strength than the cross member center portion.

6. The vehicle substructure of claim 5, wherein:
   the cross member is positioned below the battery, and the pair of side members are fixed at positions outside of the battery.

7. The vehicle substructure of claim 6, wherein:
   the cross member low-strength sections are positioned below the floor cross member low-strength sections.

* * * * *